United States Patent
Kim et al.

(10) Patent No.: US 8,486,546 B2
(45) Date of Patent: Jul. 16, 2013

(54) CAP ASSEMBLY AND SECONDARY BATTERY USING THE SAME WITH NOTCHED VENT MEMBER

(75) Inventors: Dae-Kyu Kim, Suwon-Si (KR); Kyeong-Min Jeong, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 413 days.

(21) Appl. No.: 12/486,315

(22) Filed: Jun. 17, 2009

(65) Prior Publication Data
US 2010/0136388 A1    Jun. 3, 2010

Related U.S. Application Data

(60) Provisional application No. 61/118,996, filed on Dec. 1, 2008.

(51) Int. Cl.
*H01M 2/12* (2006.01)

(52) U.S. Cl.
USPC .................. 429/56; 429/53; 429/82; 429/175

(58) Field of Classification Search
USPC .......................................................... 429/56
See application file for complete search history.

(56) References Cited

U.S. PATENT DOCUMENTS

| | | | |
|---|---|---|---|
| 5,707,756 A | 1/1998 | Inoue et al. | |
| 5,879,832 A | 3/1999 | Vu et al. | |
| 6,346,344 B1 | 2/2002 | Song et al. | |
| 6,537,693 B1 | 3/2003 | Suzuki et al. | |
| 7,981,541 B2 | 7/2011 | Sato et al. | |
| 2003/0013005 A1* | 1/2003 | Chang | 429/53 |
| 2003/0027038 A1 | 2/2003 | Tsukamoto et al. | |
| 2005/0074667 A1 | 4/2005 | Yang | |
| 2005/0084752 A1 | 4/2005 | Kim et al. | |
| 2006/0078787 A1 | 4/2006 | Sato | |
| 2006/0093904 A1 | 5/2006 | Cheon et al. | |

(Continued)

FOREIGN PATENT DOCUMENTS

| | | | |
|---|---|---|---|
| CN | 1784798 | | 6/2006 |
| JP | 06-140011 | * | 5/1994 |

(Continued)

OTHER PUBLICATIONS

EP Search Report for related EP Application No. 09177456.2-2119, Feb. 2, 2010.

(Continued)

*Primary Examiner* — Ula C Ruddock
*Assistant Examiner* — Tony Chuo
(74) *Attorney, Agent, or Firm* — Knobbe, Martens, Olson & Bear, LLP (57) ABSTRACT

A cap assembly for a battery and a battery incorporating the cap assembly. The cap assembly includes a plate that connects the electrodes of the bare cell of the battery. The cap assembly includes a vent member that includes a protrusion that is physically connected to the plate. Excess pressure within the bare cell results in the protrusion disconnecting from the plate thereby interrupting current. The vent further includes two circular notches, an inner notch and an outer notch. The vent further includes a cross notch that extends radially outward so as to intersect and extend beyond both the first and second notches. The notches are configured to release when the pressure within the bare cell exceeds a burst pressure.

19 Claims, 8 Drawing Sheets

U.S. PATENT DOCUMENTS

| | | | |
|---|---|---|---|
| 2007/0134547 A1* | 6/2007 | Bouffard et al. | 429/56 |
| 2007/0212595 A1* | 9/2007 | Kim et al. | 429/53 |
| 2008/0131769 A1 | 6/2008 | Sato et al. | |
| 2008/0182159 A1 | 7/2008 | Mitani et al. | |
| 2009/0061310 A1 | 3/2009 | Kim | |
| 2009/0186269 A1 | 7/2009 | Kim et al. | |

FOREIGN PATENT DOCUMENTS

| | | |
|---|---|---|
| JP | 06-215746 | 8/1994 |
| JP | 06-215747 | 8/1994 |
| JP | 07-027051 | 5/1995 |
| JP | 07-254401 | 10/1995 |
| JP | 08-153536 | 6/1996 |
| JP | 95-027051 | 8/1996 |
| JP | 08-293295 | 11/1996 |
| JP | 10 340714 | 12/1998 |
| JP | 2000-090912 | 3/2000 |
| JP | 2001-196047 | 7/2001 |
| JP | 2001-351608 | 12/2001 |
| JP | 2002-170531 | 6/2002 |
| JP | 2003-187773 | 7/2003 |
| JP | 2003-217544 | 7/2003 |
| JP | 2004-152697 | 5/2004 |
| JP | 2004-319465 | 11/2004 |
| JP | 2005-174903 | 6/2005 |
| JP | 2006-066269 | 3/2006 |
| JP | 2006-286561 | 10/2006 |
| JP | 2007-207453 | 8/2007 |
| JP | 2008-130482 | 6/2008 |
| KR | 97-47070 | 7/1997 |
| KR | 1020010056363 | 12/1999 |
| KR | 1020010051870 | 6/2001 |
| KR | 1020010061303 | 7/2001 |
| KR | 1020010101035 | 11/2001 |
| KR | 1020030066243 | 8/2003 |
| KR | 100471966 | 2/2005 |
| KR | 1020070076172 | 1/2006 |
| KR | 102006 002236 | 3/2006 |
| KR | 100579400 | 5/2006 |
| KR | 1020060037595 | 5/2006 |
| KR | 1020060112728 | 11/2006 |
| KR | 1020060118719 | 11/2006 |
| KR | 10-0734758 | 6/2007 |
| KR | 1020070093171 | 9/2007 |
| KR | 1020080007155 | 1/2008 |
| KR | 1020080022945 | 3/2008 |
| KR | 1020080043533 | 5/2008 |
| KR | 1020080082266 | 9/2008 |
| KR | 1020080099449 | 11/2008 |

OTHER PUBLICATIONS

Notice of Allowability for related Korean Application No. 10-2007-0086143, Nov. 28, 2008.

Decision of Grant issued on Nov. 25, 2010 in corresponding KR Patent Application No. 10-2009-0059902.

Office Action dated Jan. 30, 2012 for corresponding CN Application No. 200910246085.0.

Office Action dated Oct. 18, 2012 for related U.S. Appl. No. 12/199,744.

Office Action dated Apr. 19, 2012 for corresponding U.S. Appl. No. 12/199,744.

Office Action dated Oct. 10, 2012 for corresponding CN Application No. 200910246085.0.

Notice of Allowability dated Jan. 22, 2013 for corresponding JP Application No. 2009-273374.

* cited by examiner

CAP ASSEMBLY AND SECONDARY BATTERY USING THE SAME WITH NOTCHED VENT MEMBER

CROSS-REFERENCE TO RELATED APPLICATIONS

This application claims the benefit of U.S. Provisional Application Ser. No. 61/118,996, entitled Cap Assembly and Secondary Battery Using the Same, filed Dec. 1, 2008 which is hereby incorporated by reference in its entirety.

BACKGROUND OF THE INVENTION

1. Field of the Invention

The present invention relates to a cap assembly and a secondary battery using the same, and more particularly, to a cap assembly having a vent which is capable of operating even when a low pressure is generated in a battery to thereby improve safety of the battery, and a secondary battery using the same.

2. Description of the Related Art

In recent years, active development and production of compact, lightweight portable electronic/electrical devices, such as cellular phones, notebook computers, and camcorders has been accompanied by widespread use of secondary batteries to power the portable electronic/electrical devices even in places without additional power sources. While dry cell batteries cannot be reused after they are electrically discharged once, the secondary batteries may be repeatedly used because they are capable of being charged and discharged.

Also, since it becomes possible to embody high-capacity secondary batteries, the secondary batteries may be applied not only to portable electronic devices but also to high-output products, such as hybrid automobiles and electric-powered tools.

Secondary batteries may include, for example, nickel-cadmium (Ni—Cd) batteries, nickel-hydrogen (Ni—H) batteries, nickel-zinc (Ni—Zn) batteries, lithium ion secondary batteries, and lithium polymer secondary batteries. Among these secondary batteries, lithium ion secondary batteries are extensively employed because they operate at high voltages and have high energy density per unit weight.

Formation of lithium ion secondary batteries includes putting an electrode assembly and an electrolyte in an exterior material and sealing the exterior material. The lithium ion secondary batteries may be classified into can-type batteries and pouch-type batteries depending on the type of exterior material. Can-type lithium ion secondary batteries may be divided into cylinder-type batteries and prismatic-type batteries.

Formation of a cylindrical secondary battery includes forming an electrode assembly by stacking a positive electrode plate, a separator, and a negative electrode plate and winding the stack structure, putting the electrode assembly and an electrolyte into a cylindrical can, and sealing the cylindrical can using a cap assembly.

When a secondary battery is overcharged, the electrolyte may evaporate so that the resistance of the secondary battery can increase and heat can be generated. As a result, an internal temperature of the secondary battery may be raised, and an internal pressure of the secondary battery may also increase due to gas generated by an electrode assembly. This may result in accidents, such as fires and explosions.

In order to address the foregoing problems, a cylindrical secondary battery includes a safety device for interrupting current flow when an internal pressure of the battery is at a predetermined level or higher.

When the internal pressure of the secondary battery reaches the predetermined level or higher due to generation of a predetermined amount of gas in overcharge, a current breaker, such as a vent, may be enabled to prevent current flow, thereby providing battery safety.

However, a conventional vent operates under a relatively high pressure of about 9 kgf/cm$^2$, meaning that current flow may be cut off only when an internal pressure of a secondary battery is about 9 kgf/cm$^2$ or higher. Therefore, it is more difficult to ensure battery safety when the internal pressure of the secondary battery is lower.

SUMMARY OF THE INVENTION

The present invention provides a cap assembly having a vent which is capable of operating under a low burst pressure to improve battery safety, and a secondary battery using the same.

In one embodiment, the present invention comprises a cap assembly for a battery that includes a bare cell with an electrode. In this embodiment the cap assembly comprises a plate that is adapted to be electrically connected to the electrode of the bare cell. The cap assembly further comprises a vent member that includes a protrusion that is physically connected to the plate so as to be electrically connected to the electrode assembly and wherein the protrusion is adapted to physically disconnect from the plate at a first operating pressure of the battery. The vent member further defines first and second circular notches and a third cross notch that intersects the first and second circular notches. The first and second circular notches extend around the protrusion and the cross notch extends outward from the first circular notch through the second circular notch so as to intersect the second circular notch and further extend outward form the second circular notch.

In this embodiment, the vent is capable of operating under a lower battery pressure which thereby improves the safety of the battery. These and other objects and advantages of the present invention will become more apparent from the following description taken in conjunction with the accompanying drawings.

BRIEF DESCRIPTION OF THE DRAWINGS

The above and other features of the present invention will become more apparent by describing certain exemplary embodiments thereof with reference to the attached drawings in which.

DETAILED DESCRIPTION OF THE PREFERRED EMBODIMENT

The present invention will be described more fully hereinafter with reference to the accompanying drawings, in which exemplary embodiments of the invention are shown. In the drawings, the thicknesses of layers and regions are exaggerated for clarity. Like reference numerals designate like elements throughout the specification.

Figure 1A:
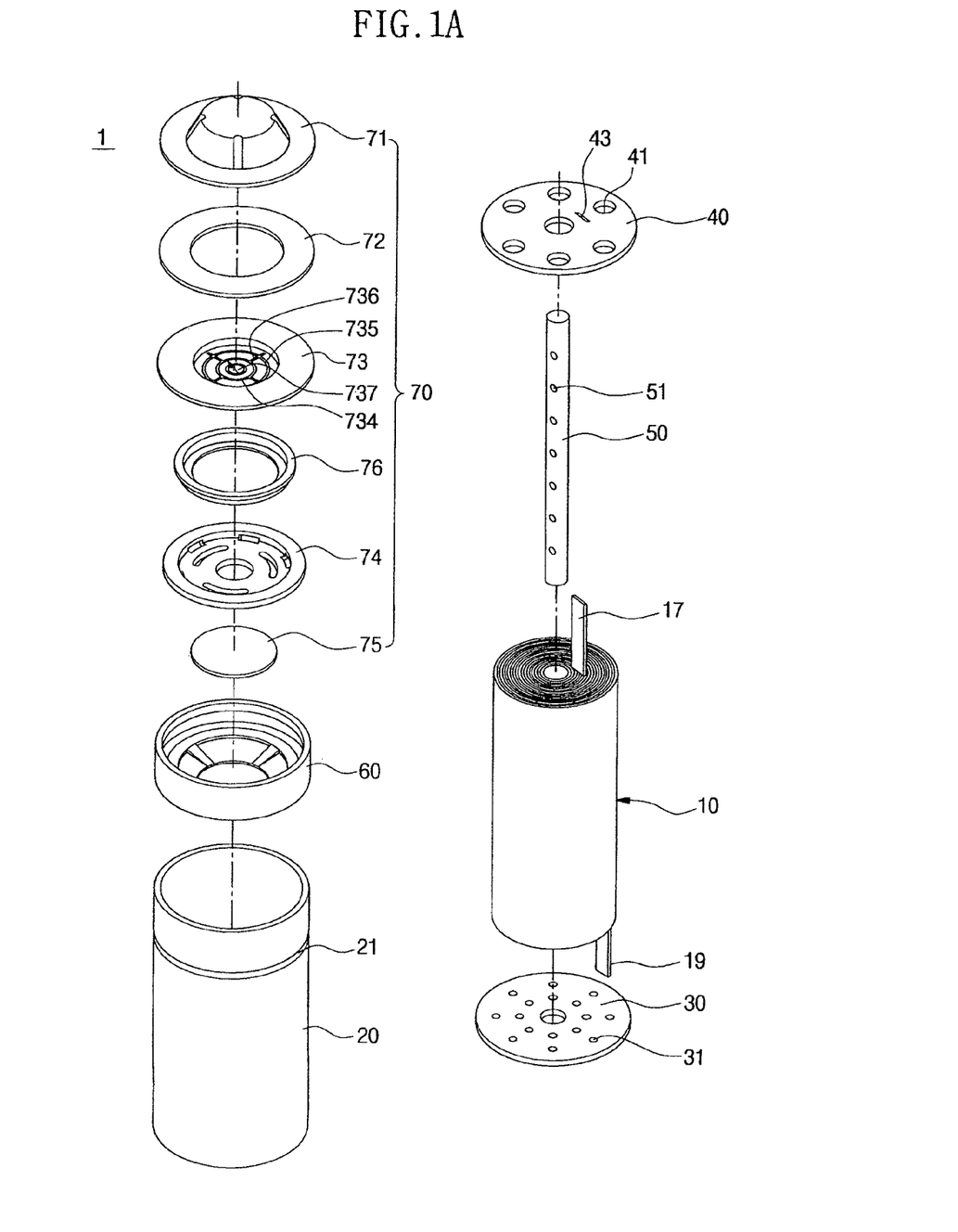
FIG. 1A is an exploded perspective view of a secondary battery according to an exemplary embodiment of the present invention.
Figure 1B:
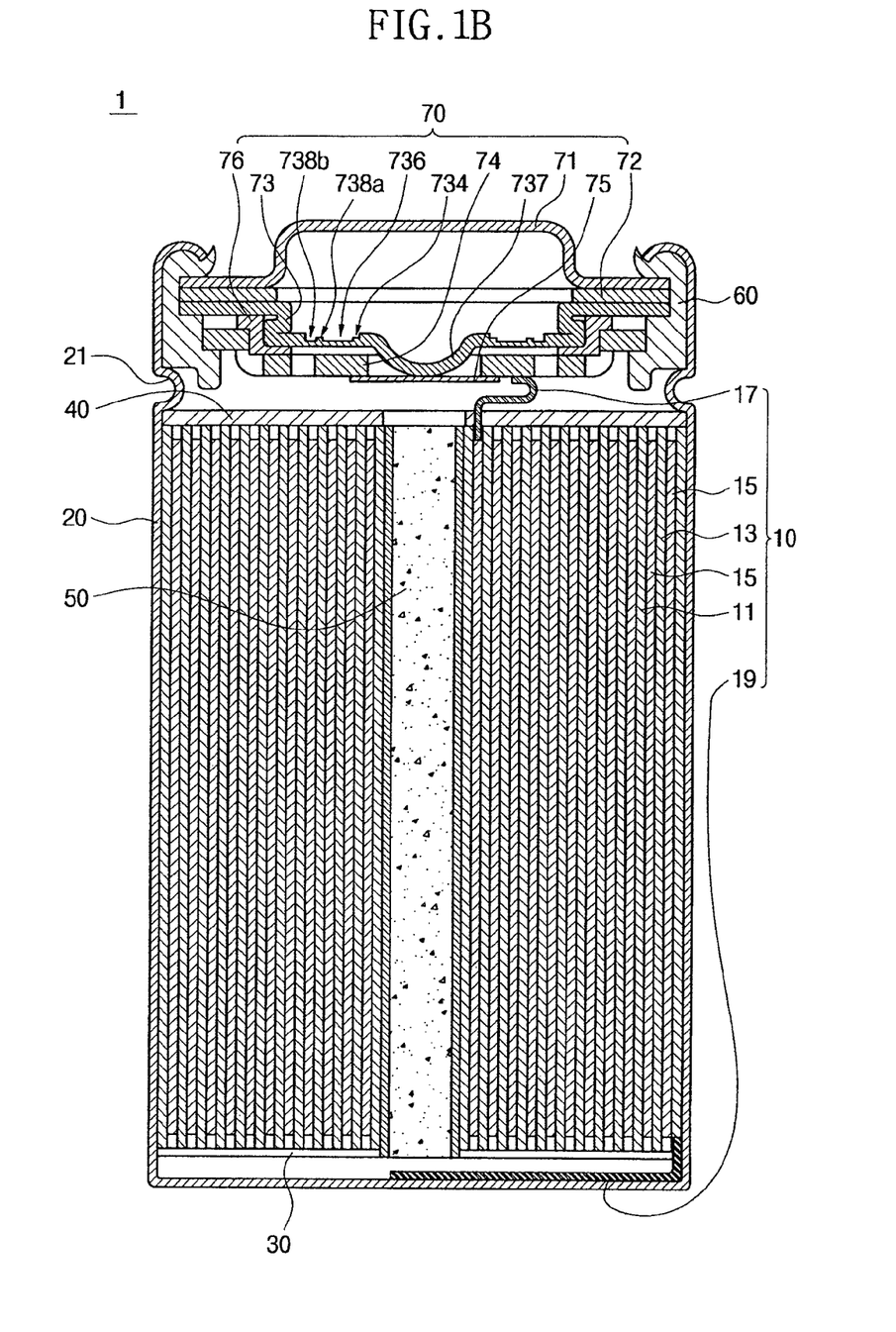
FIG. 1B is a cross-sectional view of the secondary battery of FIG. 1A assembled.

FIG. 1A is an exploded perspective view of a secondary battery according to an exemplary embodiment of the present invention, and FIG. 1B is a cross-sectional view of the secondary battery of FIG. 1A assembled.

Referring to FIGS. 1A and 1B, a secondary battery 1 includes an electrode assembly 10, a can 20 containing the electrode assembly 10, and a cap assembly 70 for sealing the can 20.

Also, the secondary battery 1 may further include a bottom insulating plate 30, a top insulating plate 40, a center pin 50, and an insulating gasket 60.

The electrode assembly 10 may be formed as a jelly-roll type by stacking and winding first and second electrode plates 11 and 13, each of which is formed as a rectangular plate type.

Thus, the electrode assembly 10 may have a hollow cylindrical shape.

The first and second electrode plates 11 and 13 may have different polarities, and a separator 15 may be interposed between the first and second electrode plates 11 and 13 in order to prevent short-circuiting between the first and second electrode plates 11 and 13.

Each of the first and second electrode plates 11 and 13 may be formed by coating positive electrode active material slurry or negative electrode active material slurry on a collection plate formed of aluminum (Al) or copper (Cu).

Each of the first and second electrode plates 11 and 13 may include a non-coating portion that is not coated with slurry, and first and second electrode tabs 17 and 19 may be respectively adhered to non-coating portions of the first and second electrode plates 11 and 13 so as to form an electrical conduction path between the first and second electrode plates 11 and 13.

That is, the first electrode tab 17 may be adhered to the non-coating portion of the first electrode plate 11, while the second electrode tab 19 may be adhered to the non-coating portion of the second electrode plate 13.

Thus, the first and second electrode tabs 17 and 19 may have the same polarities as the first and second electrode plates 11 and 13, respectively.

The first electrode tab 17 may be a top electrode tab projecting upward from a top surface of the electrode assembly 10 toward an opening of the can 20, while the second electrode tab 19 may be a bottom electrode tab projecting downward a bottom surface of the electrode assembly 10.

Conversely, the first electrode tab 17 may project downward the bottom surface of the electrode assembly 10, while the second electrode tab 19 may project upward from the top surface thereof.

Of course, the first and second electrode tabs 17 and 19 may project in the same direction according to a method of forming a battery.

The can 20 may be formed of a metal, such as Al or stainless steel (SUS), and have various shapes, such as a cylindrical shape.

In addition, the can 20 may have an opening in one surface thereof.

The electrode assembly 10 may be inserted into the can 20 through the opening of the can 20, and the bottom insulating plate 30 may be disposed on the bottom surface of the electrode assembly 10.

Before the electrode assembly 10 is inserted into the can 20, the second electrode tab 19 may be bent toward the center of the electrode assembly 10 to be parallel to the bottom surface of the electrode assembly 10.

A portion of the bent second electrode tab 19 may run across a hollow of the electrode assembly 10.

When the secondary battery 1 includes the bottom insulating plate 30, the bottom insulating plate 30 may have a through hole corresponding to the hollow of the electrode assembly 10.

Accordingly, the portion of the bent second electrode tab 19 may also run across the through hole of the bottom insulating plate 30.

The bottom insulating plate 30 may have a plurality of holes 31 to minimize the reduction of an injected electrolyte due to a space reduced by the bottom insulating plate 30.

When components of the secondary battery 1 are prepared as described above, a welding rod may be inserted into the hollow of the electrode assembly 10 and the through hole of the bottom insulating plate 30 so that the second electrode tab 19 can be welded to a bottom surface of the can 20.

As a result, the can 20 may have the same polarity as the second electrode tab 19 and function as an electrode terminal.

The top insulating plate 40 may be located on the electrode assembly 10 inserted into the can 20, and the center pin 50 may be inserted into the hollow formed in the center of the electrode assembly 10.

The top insulating plate 40 may include a plurality of first holes 41 to facilitate permeation of the electrolyte into the electrode assembly 10.

Also, the top insulating plate 40 may include a second hole 43 to externally project the first electrode tab 17.

The center pin 50 may prevent deformation of the electrode assembly 10 due to an external force. When the center pin 50 has a central hollow, it may function as a path through which gas generated by the electrode assembly 10 passes.

The center pin 50 may include a plurality of holes 51 formed in a lateral surface thereof to facilitate penetration of the electrolyte and emission of gas generated by the electrode assembly 10.

The can 20 may include a bead 21 which is formed by bending a lateral surface of the can 20 inward on the same level with the top of the top insulating plate 40.

The bead 21 may prevent the electrode assembly 10 inserted into the can 20 from moving freely up and down.

The insulating gasket 60 may be inserted into the opening of the can 20, and the cap assembly 70 may be inserted into and combined with the insulating gasket 60 to seal the can 20.

The insulating gasket 60 may be formed of an insulating elastic material and wrap an outer surface of the cap assembly 70.

The insulating gasket 60 may insulate the can 20 and cap assembly 70 having different polarities from each other and seal the can 20.

The cap assembly 70 may include a cap-up 71, which functions as an electrode terminal, and a lower component disposed under the cap-up 71.

Respective components of the cap assembly 70 may be assembled and then installed in the insulating gasket 60 at the same time, or sequentially stacked in the insulating gasket 60.

The lower component may include a positive temperature coefficient (PTC) thermistor 72, a vent 73, a cap-down 74, and a sub-plate 75, which are sequentially located under the cap-up 71.

Specifically, the vent 73 may be located under the PTC thermistor 72, and the cap-down 74 having a hollow may be located under the vent 73 by interposing an insulator 76 therebetween. Thus, the vent 73 may be insulated from the cap-down 74 by the insulator 76.

The cap-down 74 may further include a through hole functioning as a path through which a pressure is applied to a bottom surface of the vent 73 when an internal pressure of the secondary battery 1 increases.

The sub-plate 75 may be located under the cap-down 74 and run across the hollow of the cap-down 74.

The sub-plate 75 may be connected to a protrusion 737 of the vent 73, which is exposed by the hollow of the cap-down 74, using a welding process.

Accordingly, the protrusion 737 may be convex toward the bottom of the cap assembly 70, that is, the electrode assembly 10 contained in the can 20.

The first electrode tab 17, which projects upward from the electrode assembly 10, may be connected to a bottom surface of the cap-down 74 or a bottom surface of the sub-plate 75 using a welding process.

The cap-down 74 and the sub-plate 75 may be connected to each other using a laser welding process, and a protrusion 73a of the vent 73 and the sub-plate 75 may be connected to each other using an ultrasonic welding process.

Hereinafter, the characteristics of the secondary battery 1 according to the present invention will now be described.

According to the present invention, the vent 73 may include a notch portion.

Figure 2A:
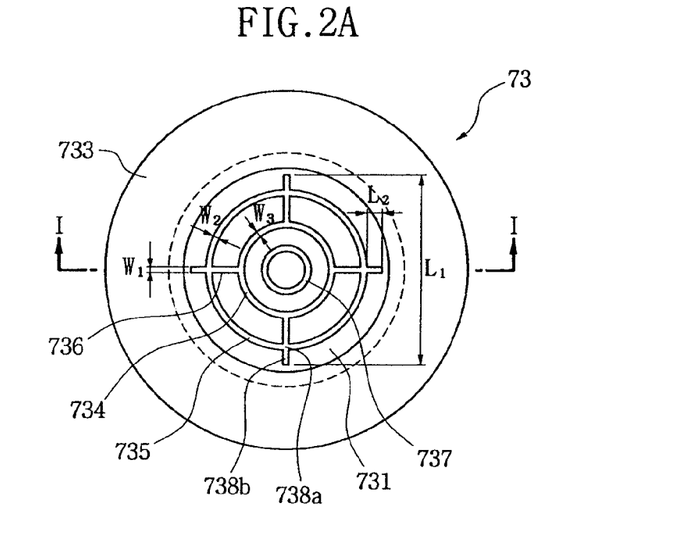
FIG. 2A is a plan view showing the shape of a vent according to an exemplary embodiment of the present invention.

The notch portion may be formed to facilitate the bending or burst of a portion of the vent 73 in order to prevent current flow when an internal pressure of the secondary battery 1 increases. The notch portion may include a first notch 734 which is formed as a circular type along a circumference of the protrusion 737, a second notch 736 which extends as a cross (+) type from the first notch 734, and a third notch 735 which intersects the cross-shaped second notch 736 and is formed as a circular type outside the first notch 734.

That is, according to the present invention, the notch portion includes the first and third notches 734 and 735 each having a circular shape, and the second notch 736 having a cross shape. Also, the notch portion includes an intersection portion 738a at which the second notch 736 intersects the third notch 735. After intersecting the third notch 735, the second notch 736 may further extend to have an extension 738b.

As shown in FIG. 2A, the second notch 736 extends from the first notch 734 and does not form a clear cross shape. However, when the second notch 736 further extends along a virtual line inward from the first notch 734, it may form a clear cross (+) shape. Thus, in the present invention, the shape of the second notch 736 shown in FIG. 2A will be defined as a cross (+) shape.

Figure 2B:
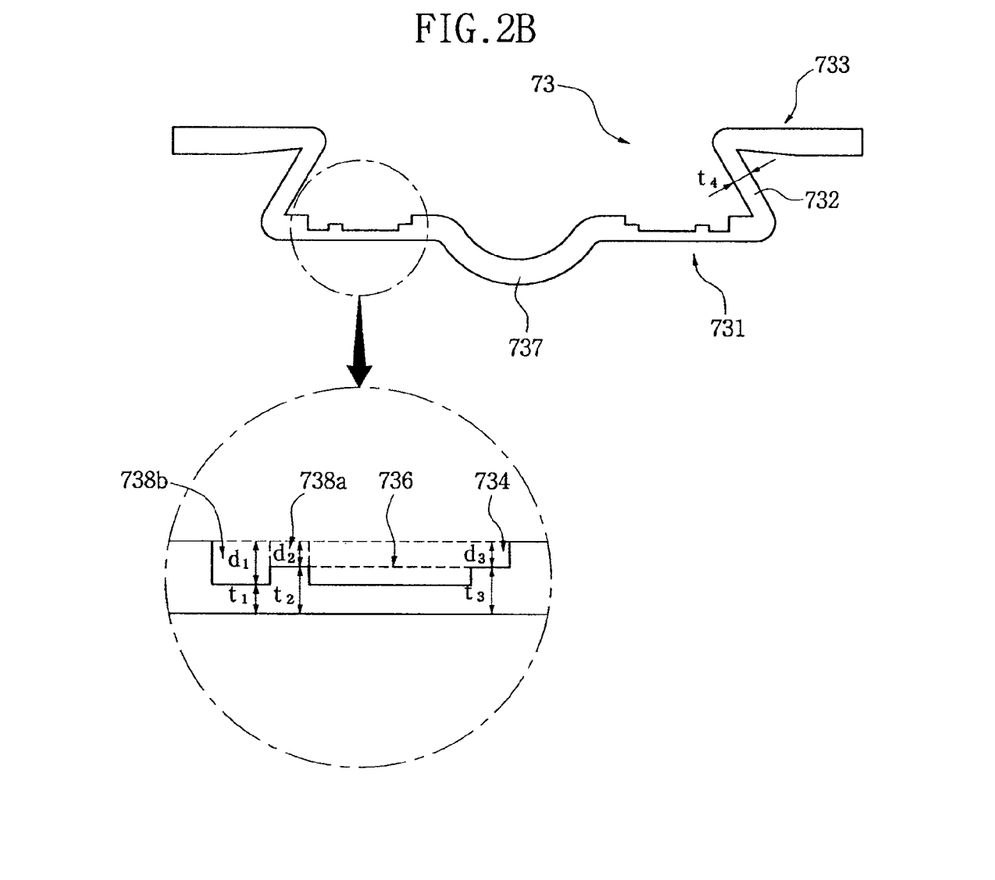
FIG. 2B is a cross-sectional view taken along line I-I of FIG. 2A.

FIG. 2A is a plan view showing the shape of a vent according to an exemplary embodiment of the present invention, and FIG. 2B is a cross-sectional view taken along line I-I of FIG. 2A.

Referring to FIGS. 2A and 2B, a vent 73 of a secondary battery according to the present invention may include a body portion 731, a flange portion 733, a connection portion 732 for connecting the body 731 and the flange 733, and a protrusion 737. The body portion 731 includes a notch portion.

As described above, the notch portion may include a first notch 734 which is formed as a circular type along a circumference of the protrusion 737, a second notch 736 which extends as a cross type from the first notch 734, and a third notch 735 which intersects the cross-shaped second notch 736 and is formed as a circular type outside the first notch 734. Also, the notch portion includes an intersection portion 738a at which the second notch 736 intersects the third notch 735. After intersecting the third notch 735, the second notch 736 may further extend to have an extension 738b.

In this case, the first notch 734 having a circular shape may have a diameter of about 2.5 to 3 mm, and the third notch 735 having a circular shape may have a diameter of about 5.0 to 7.0 mm.

Also, the first notch 734 may have a width W3 of about 0.1 to 0.2 mm, the third notch 735 may have a width W2 of about 0.1 to 0.2 mm, and the second notch 736 may have a width W1 of about 0.05 to 0.15 mm.

The second notch 736, which extends from the first notch 734 and has the cross shape, may have an entire length or width L1 of about 8.08 mm to 8.18 mm. Thus, a length L2 of the extension 738b of the second notch 736 may depend on the diameter of the third notch 735.

In addition, the first notch 734 may have a depth d3 of about 0.14 to 0.20 mm, and the third notch 735 may have a depth d2 of about 0.16 mm or more, for example, about 0.18 to 0.19 mm. The second notch 736 may have a depth d1 of about 0.17 mm or more, which is greater than the depth d2 of the third notch 735.

In this case, a thickness t1 of the second notch 736, a thickness t2 of the third notch 735, and a thickness t3 of the first notch 734 may respectively correspond to values obtained by subtracting the depth d1 of the second notch 736, the depth d2 of the third notch 735, and the depth d3 of the first notch 734 from a thickness of the body portion 731 of the vent 73.

Furthermore, the connection portion 732 may have a thickness t4 of about 0.18 mm or more. When the connection portion 732 has a thickness t4 of less than about 0.18 mm, cracks are likely to be generated in the connection portion 732.

Meanwhile, a predetermined amount of gas may be generated in the secondary battery due to various factors, for example, overcharging, thus resulting in a rise in an internal pressure of the secondary battery.

In this case, the protrusion 737 which protrudes downward in the center of the vent 73 may be electrically connected to a top surface of a sub-plate 75 by welding. Thus, the protrusion 737 may move upward due to the rise in the internal pressure of the secondary battery.

Due to the motion of the protrusion 737, welded portions of the protrusion 737 and the sub-plate 75 may be detached from each other or a predetermined region of the sub-plate 75 may be cut, thereby blocking electrical flow of the secondary battery.

In the present invention, an internal pressure of the secondary battery measured when the welded portions of the protrusion 737 and the sub-plate 75 are detached from each other or the predetermined region of the sub-plate 75 is cut is referred to as an operating pressure for current interruption.

Also, in the present invention, the cross-shaped second notch 736 may be deformed due to the internal pressure of the secondary battery and mainly control the operating pressure.

Specifically, the second notch 736 may be deformed due to the increased internal pressure of the secondary battery so that the protrusion 737 can move upward. As a result, the welded portions of the protrusion 737 and the sub-plate 75 are separated from each other or the predetermined region of the sub-plate 75 is cut, thereby interrupting the electrical flow of the secondary battery.

Also, when the electrical flow of the secondary battery is interrupted by separating the welding portions of the protrusion 737 and the sub-plate 75 or cutting the predetermined region of the sub-plate 75, even if the charging of the secondary battery is interrupted, gas may be continuously generated due to internal factors so as to increase the internal pressure of the secondary battery, or the internal pressure of the secondary battery may further increase due to external factors.

The increased internal pressure may lead to a burst in the vent 73.

Specifically, the secondary battery may burst due to a continuous increase in the internal pressure of the secondary battery. In order to prevent bursting of the secondary battery, when the internal pressure of the secondary battery is a predetermined pressure or higher, the vent 73 may be allowed to burst so that gas can be emitted to lower the internal pressure of the secondary battery.

In the present invention, an internal pressure of the secondary battery measured during the burst in the vent 73 is referred to as a burst pressure.

Also, in the present invention, a portion of the vent 73 which bursts due to the internal pressure of the secondary battery may correspond to the third notch 735 that intersects the cross-shaped second notch 736 and is formed as the circular type outside the first notch 734.

In other words, the circular third notch 735 may burst due to the increased internal pressure of the secondary battery so that gas can be emitted through the third notch 735 to reduce the internal pressure of the secondary battery.

Meanwhile, as described above, the depth d1 of the second notch 736 may be greater than the depth d2 of the third notch 735.

That is, according to the present invention as explained above, the cross-shaped second notch 736 may be deformed due to the internal pressure and control the operating pressure, while the circular third notch 735 may burst due to the increased internal pressure. In most cases, since a burst pressure is higher than the operating pressure, by controlling the depth d1 of the second notch 736 to be greater than the depth d2 of the third notch 735, only the second notch 736 may be affected under the operating pressure, while the third notch 735 having a relatively great thickness is not affected. Afterwards, the third notch 735 may burst due to the burst pressure that is higher than the operating pressure.

In addition, the burst pressure may be controlled by adjusting the thickness t2 of the circular third notch 735. For example, as the thickness t2 of the third notch 735 increases, the burst pressure also increases.

Figure 2C:
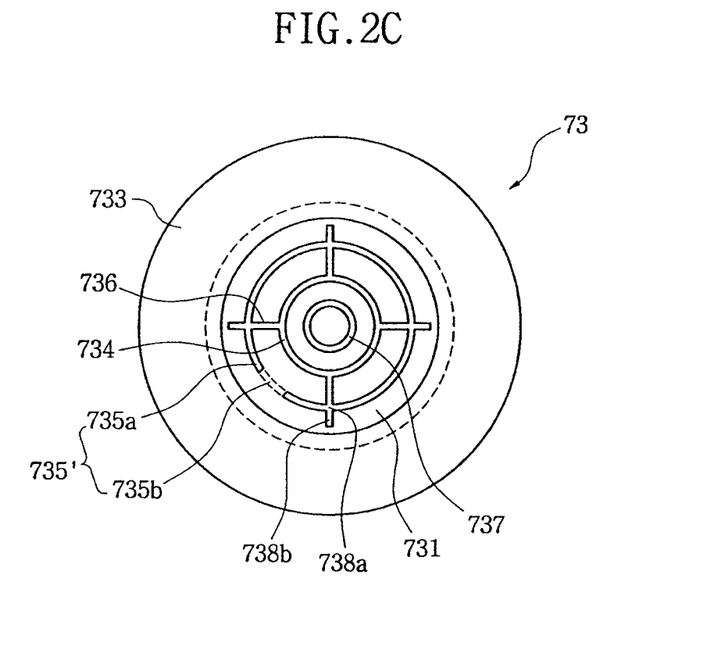
FIG. 2C is a plan view showing the shape of a vent according to another exemplary embodiment of the present invention.

FIG. 2C is a plan view showing the shape of a vent according to another exemplary embodiment of the present invention.

The vent shown in FIG. 2C may have the same shape as the vent 73 shown in FIG. 2A except for particulars mentioned below.

Referring to FIG. 2C, a vent 73 according to the present embodiment may include a body portion 731, a flange portion 733, a connection portion (not shown) for connecting the body portion 731 and the flange portion 733, and a protrusion 737. The body portion 731 may include a notch portion.

As described above, the notch portion may include a first notch 734 which is formed as a circular type along a circumference of the protrusion 737, a second notch 736 which extends as a cross type from the first notch 734, and a third notch 735' which intersects the cross-shaped second notch 736 and is formed as a circular type outside the first notch 734. Also, the notch portion includes an intersection portion 738a at which the second notch 736 intersects the third notch 735'. After intersecting the third notch 735', the second notch 736 may further extend to have an extension 738b.

In this case, the third notch 735' may have a notch region 735a and a disconnected region 735b corresponding to a predetermined unnotched region.

As described above, a burst may occur in the circular third notch 735' so that gas can be emitted through the third notch 735' to lower an internal pressure of a secondary battery. In this case, when the third notch 735' does not have the disconnected region 735b, the entire third notch 735' may burst. As a result, a portion of the vent 73 which includes the protrusion 737 formed within the third notch 735' may collide with a cap-up or move inside the secondary battery to resume current flow.

Accordingly, in order to prevent the entire third notch 735' from bursting, the third notch 735' may have the disconnected region 735b so that the disconnection region 735b can inhibit the portion of the vent 73 including the protrusion 737 formed within the third notch 735' from being separated from the vent 73.

Since the third notch 735' of the vent 73 according to another exemplary embodiment includes the notch region 735a and the disconnected region 735b corresponding to the unnotched region, the third notch 735' does not form a clear circular shape. However, when the notch region 735a of the third notch 735' further extends along a virtual line illustrated with a dotted line in FIG. 2C to the disconnected region 735b, the third notch 735' may form a clear circular shape. Thus, in the present invention, the shape of the third notch 735' shown in FIG. 2C will be defined as a circular shape.

Hereinafter, an operating pressure and burst pressure of a secondary battery having a vent according to exemplary embodiments of the present invention will be described.

Embodiment 1

To begin with, as shown in FIG. 2B, a vent of a secondary battery according to the present embodiment included a body portion, a flange portion, a connection portion for connecting the body portion and the flange portion, and a protrusion, and the body portion included a notch portion.

In this case, as shown in FIG. 2A, the notch portion included a first notch formed as a circular type along a circumference of the protrusion, a second notch which extended as a cross type from the first notch, and a third notch which intersected the cross-shaped second notch and was formed as a circular type outside the first notch. Also, the notch portion included an intersection portion at which the second notch intersected the third notch. After intersecting the third notch, the second notch further extended to have an extension.

The body portion had a thickness of about 0.30 mm, and the connection portion had a thickness t4 of about 0.20 mm. Also, the first notch had a diameter of about 2.5 mm, and the third notch had a diameter of about 5 mm. The first notch had a width W3 of about 0.15 mm, the third notch had a width W2 of about 0.15 mm, and the second notch had a width W1 of about 0.1 mm. Also, the first notch had a depth d3 of about 0.17 mm, the third notch had a depth d2 of about 0.18 mm, and the second notch had a depth d1 of about 0.20 mm. In addition, the cross-shaped second notch had an entire length or width L1 of about 8.13 mm.

In this case, when the notch portion was formed, forming the second notch using a first mold was followed by forming the third notch using a second mold.

The operating pressure and burst pressure of the secondary battery according to the present embodiment were measured as shown in Table 1.

TABLE 1

| | Embodiment 1 | |
|---|---|---|
| Specification | Operating pressure (Kgf/cm$^2$) 8 Kgf/cm$^2$ | Burst pressure (Kgf/cm$^2$) 20 Kgf/cm$^2$ |
| 1 | 7.70 | 19.30 |
| 2 | 7.00 | 19.10 |
| 3 | 7.60 | 19.70 |
| 4 | 7.40 | 19.60 |
| 5 | 7.40 | 19.50 |
| 6 | 7.50 | 19.40 |
| 7 | 7.60 | 19.50 |
| 8 | 7.70 | 19.60 |
| 9 | 7.70 | 19.40 |
| 10 | 7.20 | 19.70 |
| 11 | 7.50 | 19.40 |
| 12 | 7.40 | 19.40 |
| 13 | 7.10 | 19.70 |
| 14 | 7.10 | 19.40 |
| 15 | 7.70 | 19.50 |
| 16 | 7.70 | 19.80 |
| 17 | 7.50 | 19.80 |
| 18 | 7.50 | 19.50 |
| 19 | 7.50 | 19.40 |
| 20 | 7.70 | 19.30 |
| 21 | 7.20 | 19.60 |
| 22 | 7.90 | 19.60 |
| 23 | 7.70 | 19.60 |
| 24 | 7.70 | 19.50 |
| 25 | 7.40 | 19.60 |
| 26 | 7.60 | 19.80 |
| 27 | 7.50 | 19.40 |
| 28 | 7.90 | 19.60 |
| 29 | 7.50 | 19.10 |
| 30 | 7.60 | 19.80 |
| 31 | 7.70 | 19.60 |
| 32 | 7.50 | 19.40 |
| 33 | 7.60 | 19.10 |
| 34 | 7.60 | 19.30 |
| 35 | 7.50 | 19.80 |
| 36 | 7.80 | 19.30 |
| 37 | 7.80 | 19.50 |
| 38 | 7.80 | 19.70 |
| 39 | 7.90 | 19.60 |
| 40 | 7.70 | 19.40 |
| 41 | 7.50 | 19.50 |
| Average | 7.56 | 19.51 |
| Short-term process capability (Cpk) | 2.31 | 4.48 |

Referring to Table 1, it can be seen that the vent of the secondary battery according to the present embodiment had an average operating pressure of about 7.56 Kgf/cm$^2$, which was lower than an operating pressure (about 9 Kgf/cm$^2$ or higher) of a conventional vent. Accordingly, current flow may be blocked even when the internal pressure of the secondary battery is low, thereby improving battery safety.

Furthermore, the secondary battery had a short-term process capability Cpk of 2.31, which facilitates mass production of the secondary battery. In general, a short-term process capability Cpk of 1.33 or higher is satisfactory in terms of mass production.

Embodiment 2

The present embodiment was the same as Embodiment 1 except that a first notch had a diameter of about 3.0 mm and a third notch had a diameter of about 6 mm.

An operating pressure and burst pressure of a secondary battery according to the present embodiment were measured as shown in Table 2.

TABLE 2

| | Embodiment 2 | |
|---|---|---|
| Specification | Operating pressure (Kgf/cm$^2$) 8 Kgf/cm$^2$ | Burst pressure (Kgf/cm$^2$) 20 Kgf/cm$^2$ |
| 1 | 7.95 | 19.05 |
| 2 | 8.22 | 19.17 |
| 3 | 7.92 | 19.10 |
| 4 | 8.50 | 19.07 |
| 5 | 8.32 | 19.20 |
| 6 | 7.87 | 19.17 |
| 7 | 8.32 | 19.32 |
| 8 | 8.05 | 18.92 |
| 9 | 8.60 | 19.45 |
| 10 | 8.10 | 19.20 |
| 11 | 8.17 | 19.40 |
| 12 | 7.87 | 18.97 |
| 13 | 8.02 | 19.22 |
| Average | 8.15 | 19.17 |
| Short-term process capability (Cpk) | 2.62 | 4.66 |

Referring to Table 2, it can be seen that a vent of the secondary battery according to the present embodiment had an average operating pressure of about 8.15 Kgf/cm$^2$, which is lower than an operating pressure (about 9 Kgf/cm$^2$ or higher) of a conventional vent. Accordingly, current flow may be blocked even when the internal pressure of the secondary battery is low, thereby improving battery safety.

Furthermore, the secondary battery had a short-term process capability Cpk of 2.62, which facilitates mass production of the secondary battery.

Embodiment 3

The present embodiment was the same as Embodiment 1 except that a third notch had a diameter of about 6 mm.

An operating pressure and burst pressure of a secondary battery according to the present embodiment were measured as shown in Table 3.

TABLE 3

| | Embodiment 3 | |
|---|---|---|
| Specification | Operating pressure (Kgf/cm$^2$) 8 Kgf/cm$^2$ | Burst pressure (Kgf/cm$^2$) 20 Kgf/cm$^2$ |
| 1 | 8.05 | 19.17 |
| 2 | 8.30 | 19.55 |
| 3 | 8.00 | 19.40 |
| 4 | 7.87 | 19.50 |
| 5 | 7.97 | 19.57 |
| 6 | 8.40 | 19.30 |
| 7 | 8.30 | 19.30 |
| 8 | 7.95 | 19.47 |
| 9 | 8.32 | 19.60 |
| 10 | 8.37 | 19.40 |
| 11 | 8.15 | 19.43 |
| Average | 8.15 | 19.43 |
| Short-term process capability (Cpk) | 3.21 | 6.16 |

Referring to Table 3, it can be seen that a vent of the secondary battery according to the present embodiment had an average operating pressure of about 8.15 Kgf/cm², which is lower than an operating pressure (about 9 Kgf/cm² or higher) of a conventional vent. Accordingly, current flow may be blocked even when the internal pressure of the secondary battery is low, thereby improving battery safety.

Furthermore, the secondary battery had a short-term process capability Cpk of 3.21, which facilitates mass production of the secondary battery.

Embodiment 4

The present embodiment was the same as Embodiment 1 except that a third notch had a diameter of about 7 mm.

An operating pressure and burst pressure of a secondary battery according to the present embodiment were measured as shown in Table 4.

TABLE 4

| | Embodiment 4 | |
|---|---|---|
| Specification | Operating pressure (Kgf/cm²) 8 Kgf/cm² | Burst pressure (Kgf/cm²) 20 Kgf/cm² |
| 1 | 7.95 | 19.17 |
| 2 | 7.75 | 19.17 |
| 3 | 7.85 | 19.37 |
| 4 | 8.06 | 19.27 |
| 5 | 7.95 | 19.27 |
| 6 | 8.16 | 19.07 |
| 7 | 7.95 | 19.37 |
| 8 | 7.95 | 18.97 |
| 9 | 7.95 | 19.27 |
| 10 | 8.16 | 19.17 |
| 11 | 7.95 | 19.17 |
| 12 | 8.16 | 18.97 |
| 13 | 8.36 | 18.76 |
| 14 | 8.06 | 18.86 |
| 15 | 7.65 | 19.07 |
| 16 | 7.95 | 18.76 |
| 17 | 7.85 | 19.07 |
| 18 | 8.16 | 18.97 |
| 19 | 8.16 | 19.07 |
| 20 | 8.26 | 19.07 |
| 21 | 8.46 | 19.17 |
| 22 | 8.26 | 18.86 |
| 23 | 8.16 | 18.97 |
| 24 | 8.06 | 19.07 |
| 25 | 7.85 | 19.17 |
| 26 | 7.75 | 18.76 |
| 27 | 8.06 | 18.76 |
| 28 | 8.06 | 19.37 |
| 29 | 8.06 | 18.97 |
| 30 | 7.95 | 19.37 |
| Average | 8.03 | 19.08 |
| Short-term process capability (Cpk) | 3.62 | 3.61 |

Referring to Table 4, it can be seen that a vent of the secondary battery according to the present embodiment had an average operating pressure of about 8.03 Kgf/cm², which is lower than an operating pressure (about 9 Kgf/cm² or higher) of a conventional vent. Accordingly, current flow may be blocked even when the internal pressure of the secondary battery is low, thereby improving battery safety.

Furthermore, the secondary battery had a short-term process capability Cpk of 3.62, which facilitates mass production of the secondary battery.

Embodiment 5

The present embodiment was the same as Embodiment 1 except that a first notch had a diameter of about 3.0 mm and a third notch had a diameter of about 6 mm.

Also, unlike Embodiment 1 in which forming the second notch using the first mold was followed by forming the third notch using the second mold, in the present embodiment, a second notch and the third notch were formed at the same time using a single mold.

An operating pressure and burst pressure of a secondary battery according to the present embodiment were measured as shown in Table 5.

TABLE 5

| | Embodiment 5 | |
|---|---|---|
| Specification | Operating pressure (Kgf/cm²) 8 Kgf/cm² | Burst pressure (Kgf/cm²) 20 Kgf/cm² |
| 1 | 7.86 | 19.90 |
| 2 | 7.51 | 19.92 |
| 3 | 7.48 | 19.98 |
| 4 | 7.99 | 19.97 |
| 5 | 7.33 | 19.77 |
| 6 | 7.39 | 19.69 |
| 7 | 7.66 | 20.08 |
| 8 | 7.62 | 19.79 |
| 9 | 7.84 | 19.82 |
| 10 | 7.51 | 20.20 |
| 11 | 7.62 | 19.95 |
| 12 | 8.07 | 19.79 |
| 13 | 7.79 | 19.92 |
| 14 | 7.75 | 19.85 |
| 15 | 7.46 | 20.21 |
| 16 | 7.95 | 20.18 |
| 17 | 7.45 | 20.01 |
| 18 | 7.24 | 19.79 |
| 19 | 7.30 | 19.74 |
| 20 | 7.34 | 19.83 |
| 21 | 7.39 | 19.95 |
| 22 | 7.51 | 20.11 |
| 23 | 7.52 | 19.62 |
| 24 | 7.48 | 19.85 |
| 25 | 7.79 | 19.95 |
| 26 | 7.59 | 19.92 |
| 27 | 7.31 | 19.82 |
| 28 | 7.36 | 19.78 |
| 29 | 7.72 | 19.81 |
| 30 | 7.48 | 20.01 |
| 31 | 7.51 | 19.84 |
| 32 | 7.57 | 19.79 |
| 33 | 7.57 | 19.81 |
| 34 | 7.60 | 19.78 |
| 35 | 7.57 | 19.79 |
| 36 | 7.37 | 19.64 |
| 37 | 7.45 | 19.82 |
| 38 | 7.34 | 19.92 |
| 39 | 7.66 | 19.89 |
| 40 | 7.71 | 19.89 |
| 41 | 7.72 | 19.75 |
| 42 | 7.44 | 19.85 |
| 43 | 7.67 | 19.89 |
| 44 | 7.54 | 19.49 |
| 45 | 7.72 | 19.75 |
| 46 | 7.57 | 19.65 |
| 47 | 7.88 | 19.70 |
| 48 | 7.61 | 19.55 |
| 49 | 7.45 | 19.61 |
| 50 | 7.87 | 19.71 |
| Average | 7.58 | 19.85 |
| Short-term process capability (Cpk) | 2.73 | 6.13 |

Referring to Table 5, it can be seen that a vent of the secondary battery according to the present embodiment had an average operating pressure of about 7.58 Kgf/cm², which was lower than an operating pressure (about 9 Kgf/cm² or higher) of a conventional vent. Accordingly, current flow may be blocked even when the internal pressure of the secondary battery is low, thereby improving battery safety.

Furthermore, the secondary battery had a short-term process capability Cpk of 2.73, which facilitates mass production of the secondary battery.

In addition, even though the second and third notches were formed at the same time, it was possible to control the operating pressure of the vent to be less than about 9 Kgf/cm². Moreover, a process time could be shortened compared with Embodiment 2 in which the second and third notches were formed separately.

Hereinafter, an operating pressure and burst pressure of a secondary battery having a vent according to comparative examples will be described.

Comparative Example 1

Figure 3A:
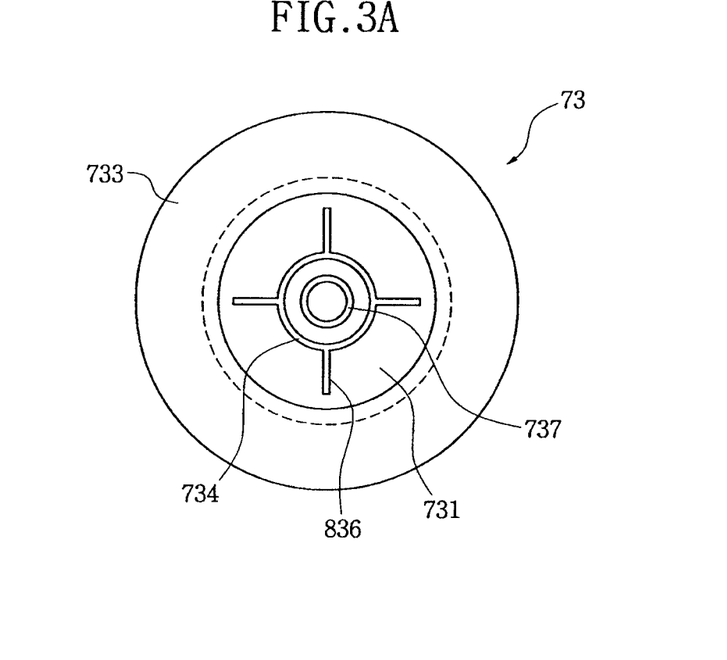
FIG. 3A is a plan view showing the shape of a vent according to a comparative example.

FIG. 3A is a plan view showing the shape of a vent according to Comparative example 1.

To begin with, referring to FIG. 3A, a vent 73 of a secondary battery according to Comparative example 1 included a body portion 731, a flange portion 733, a connection portion (not shown) for connecting the body portion 731 and the flange portion 733, and a protrusion 737, and the body portion included a notch portion.

In this case, the notch portion of the vent 73 included a first notch 734 formed as a circular type along a circumference of the protrusion 737, and a second notch 836 extending from the first notch 735 and formed as a cross type.

The body portion 731 had a thickness of about 0.30 mm, and the connection portion had a thickness t4 of about 0.20 mm. Also, the first notch 734 had a diameter of about 2.5 mm and a width of about 0.15 mm. The first notch 734 had a depth of about 0.17 mm, and the second notch 836 had a depth d1 of about 0.20 mm. In addition, the cross-shaped second notch 836 had an entire length or width of about 8.13 mm.

An operating pressure and burst pressure of the secondary battery according to the present comparative example were measured as shown in Table 6.

TABLE 6

| | Comparative example 1 | |
|---|---|---|
| Specification | Operating pressure (Kgf/cm²) 8 Kgf/cm² | Burst pressure (Kgf/cm²) 20 Kgf/cm² |
| 1 | 9.22 | 18.37 |
| 2 | 9.05 | 18.40 |
| 3 | 9.07 | 18.32 |
| 4 | 8.95 | 18.52 |
| 5 | 8.90 | 18.25 |
| 6 | 8.90 | 18.32 |
| 7 | 8.92 | 18.00 |
| 8 | 9.02 | 18.20 |
| 9 | 8.90 | 18.57 |
| 10 | 9.12 | 18.52 |
| Average | 9.01 | 18.35 |
| Short-term process capability (Cpk) | 3.01 | 2.61 |

Referring to Table 6, it can be seen that the vent 73 of the secondary battery according to Comparative example 1 had an average operating pressure of about 9.01 Kgf/cm², which is about the same as an operating pressure (about 9 Kgf/cm² or higher) of a conventional vent. Thus, current flow may be blocked only when the internal pressure of the secondary battery is sufficiently high. Accordingly, it is difficult to ensure battery safety. Although an operating pressure of the vent 73 was 9.0 Kgf/cm² or lower in some cases, the operating pressure of the vent 73 substantially approximated 9.0 Kgf/cm², and thus it is difficult to say that the vent 73 of the secondary battery according to the present comparative example had a low operating pressure.

Comparative Example 2

Figure 3B:
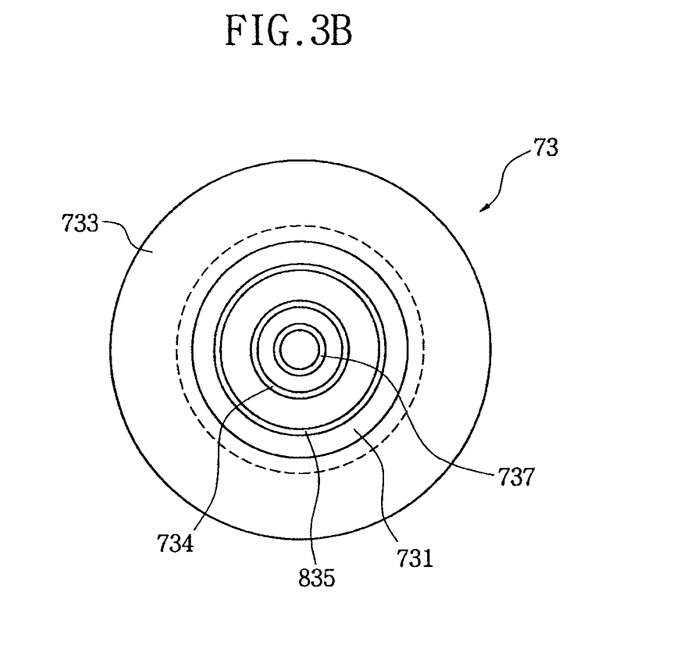
FIG. 3B is a plan view showing the shape of a vent according to another comparative example.

FIG. 3B is a plan view showing the shape of a vent according to Comparative example 2.

Referring to FIG. 3B, a vent 73 of a secondary battery according to Comparative example 2 included a body portion 731, a flange portion 733, a connection portion (not shown) for connecting the body portion 731 and the flange portion 733, and a protrusion 737, and the body portion included a notch portion.

In this case, the notch portion of the vent 73 included a first notch 734 formed as a circular type along a circumference of the protrusion 737, and a second notch 835 formed as a circular type outside the first notch 734.

The body portion 731 had a thickness of about 0.30 mm, and the connection portion had a thickness of about 0.20 mm. Also, the first notch 734 had a diameter of about 3 mm, and the second notch 835 had a diameter of about 7 mm. Each of the first and second notches 734 and 835 had a width of about 0.15 mm. The first notch 734 had a depth of about 0.17 mm, and the second notch 835 had a depth d1 of about 0.18 mm.

An operating pressure and burst pressure of the secondary battery according to the present comparative example were measured as shown in Table 7.

TABLE 7

| | Comparative example 2 | |
|---|---|---|
| Specification | Operating pressure (Kgf/cm²) 8 Kgf/cm² | Burst pressure (Kgf/cm²) 20 Kgf/cm² |
| 1 | 9.30 | 19.70 |
| 2 | 9.60 | 19.60 |
| 3 | 9.60 | 19.60 |
| 4 | 9.60 | 19.50 |
| 5 | 9.80 | 19.50 |
| 6 | 9.80 | 19.80 |
| 7 | 9.90 | 19.70 |
| 8 | 9.60 | 19.50 |
| 9 | 9.70 | 19.60 |
| 10 | 9.50 | 19.50 |
| 11 | 9.70 | 19.60 |
| 12 | 9.80 | 19.70 |
| 13 | 9.70 | 19.70 |
| 14 | 9.90 | 19.70 |
| 15 | 9.70 | 19.70 |
| Average | 9.68 | 19.63 |
| Short-term process capability (Cpk) | 0.68 | 9.11 |

Referring to Table 7, it can be seen that the vent 73 of the secondary battery according to Comparative example 2 had an average operating pressure of about 9.68 Kgf/cm², which is higher than an operating pressure (about 9 Kgf/cm² or higher) of a conventional vent. Thus, current flow may be blocked only when the internal pressure of the secondary battery is sufficiently high. Accordingly, it is difficult to ensure battery safety.

Furthermore, the secondary battery had a short-term process capability Cpk of 0.68, which precludes mass production of the secondary battery. In general, a short-term process capability Cpk of less than 1.33 is disadvantageous in terms of mass production.

Comparative Example 3

Figure 3C:
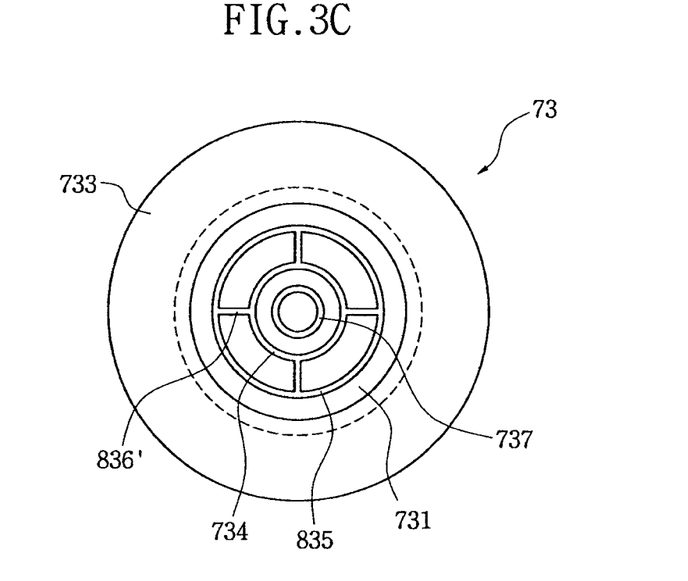
FIG. 3C is a plan view showing the shape of a vent according to another comparative example.

FIG. 3C is a plan view showing the shape of a vent according to Comparative example 3.

Referring to FIG. 3C, a vent 73 of a secondary battery according to Comparative example 3 included a body portion 731, a flange portion 733, a connection portion (not shown) for connecting the body portion 731 and the flange portion 733, and a protrusion 737, and the body portion included a notch portion.

In this case, the notch portion of the vent 73 included a first notch 734 formed as a circular type along a circumference of the protrusion 737, a second notch 836' extending from the first notch 735 and formed as a cross type, and a third notch 835 formed as a circular type outside the first notch 734. However, unlike the notch portion according to the present invention, although the third notch 835 and the second notch 836' were connected to each other, the notch portion according to Comparative example 3 included neither an intersection portion at which the second notch 836' intersected the third notch 83 nor an extension of the second notch 836' intersecting the third notch 835.

The body portion 731 had a thickness of about 0.30 mm, and the connection portion had a thickness of about 0.20 mm. Also, the first notch 734 had a diameter of about 3.0 mm, and the third notch 835 had a diameter of about 7 mm. Each of the first and third notches 734 and 835 had a width of about 0.15 mm, and the second notch 836' had a width W1 of 0.5 mm. The first notch 734 had a depth of about 0.17 mm, the third notch 835 had a depth of about 0.18 mm, and the second notch 836' had a depth of about 0.20 mm. In this case, forming the second notch 836' using a first mold was followed by forming the third notch 835 using a second mold.

An operating pressure and burst pressure of the secondary battery according to the present comparative example were measured as shown in Table 8.

TABLE 8

| Specification | Comparative example 3 | |
| --- | --- | --- |
| | Operating pressure (Kgf/cm$^2$) 8 Kgf/cm$^2$ | Burst pressure (Kgf/cm$^2$) 20 Kgf/cm$^2$ |
| 1 | 9.27 | 20.24 |
| 2 | 9.27 | 20.15 |
| 3 | 9.15 | 20.27 |
| 4 | 9.25 | 19.97 |
| 5 | 9.35 | 20.00 |
| 6 | 9.27 | 20.55 |
| 7 | 9.30 | 20.22 |
| 8 | 9.42 | 20.72 |
| 9 | 9.30 | 20.20 |
| 10 | 9.37 | 20.37 |
| 11 | 9.07 | 20.12 |
| 12 | 9.32 | 20.27 |
| Average | 9.28 | 20.26 |
| Short-term process capability (Cpk) | 2.56 | 4.30 |

Referring to Table 8, it can be seen that the vent 73 of the secondary battery according to Comparative example 3 had an average operating pressure of about 9.28 Kgf/cm$^2$, which is about the same as an operating pressure (about 9 Kgf/cm$^2$ or higher) of a conventional vent. Thus, current flow may be blocked only when the internal pressure of the secondary battery is sufficiently high. Accordingly, it is difficult to ensure battery safety.

As described above, in Comparative example 1, the notch portion of the vent 73 included the circular first notch 734 formed along the circumference of the protrusion 737 and the cross-shaped second notch 836 extending from the first notch 735. In Comparative example 2, the notch portion of the vent 73 included the circular first notch 734 formed along the circumference of the protrusion 737 and the circular second notch 835 formed outside the first notch 734. Also, in Comparative example 3, the notch portion of the vent 73 included the circular first notch 734 formed along the circumference of the protrusion 737, the cross-shaped second notch 836' extending from the first notch 735, and the circular third notch 835 formed outside the first notch 734, but it included neither the intersection portion at which the second notch 836' intersected the third notch 83 nor the extension of the second notch 836' intersecting the third notch 835. In Comparative examples 1 through 3, since it is difficult to substantially lower the operating pressure of the vent 73 to less than about 9 Kgf/cm$^2$, battery safety cannot be ensured when the internal pressure of the secondary battery is low.

On the other hand, the notch portion of the vent according to the exemplary embodiments of the present invention included the circular first notch formed along the circumference of the protrusion, the cross-shaped second notch extending from the first notch, and the circular third notch intersecting the cross-shaped second notch and formed outside the first notch. Also, the notch portion further included the intersection portion at which the second notch intersected the third notch and the extension of the second notch intersecting the third notch. In this case, it was possible to lower the operating pressure of the vent to less than 9 Kgf/cm$^2$, and specifically, to about 8 Kgf/cm$^2$. Therefore, current flow may be interrupted even when the internal pressure of the secondary battery is low, thereby improving battery safety.

Accordingly, a secondary battery according to the present invention can improve battery safety even when internal pressure is low.

In addition, the secondary battery according to the present invention lowers an operating pressure of a vent so that current flow can be blocked even when internal pressure is low.

Figure 4:
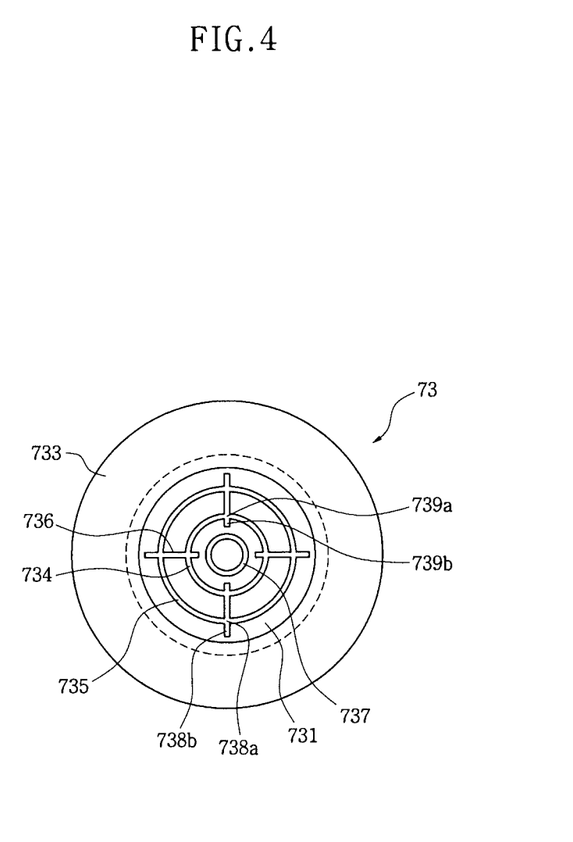
FIG. 4 is a plan view showing another shape of a vent according to an exemplary embodiment of the present invention.

FIG. 4 is a plan view showing another shape of a vent according to an exemplary embodiment of the present invention.

In FIG. 4, the shape of the vent may be the same as that shown in FIG. 2A, except for the following.

To begin with, referring to FIG. 4, a vent 73 of a secondary battery according to an exemplary embodiment of the present invention includes a body portion 731, a flange portion 733, a connection portion (not shown) for connecting the body portion 731 and the flange portion 733, and a protrusion 737, and the body portion 731 includes in a notch portion.

The notch portion, as described above, includes a first notch 734 which is formed in a circular shape along the circumference of the protrusion 737, a second notch 736 which is formed in a cross (+) shape, and a third notch 735 which intersects the cross-shaped second notch 736 and is formed in a circular shape outside the first notch 734. Also, the notch portion includes an intersection portion 738a at which the second notch 736 intersects the third notch 735. After intersecting the third notch 735, the second notch 736 may further extend to have an extension 738b.

In this case, unlike the shape of the vent shown in FIG. 2A, the vent of FIG. 4 has the cross-shaped second notch 736 intersecting the circular first notch 734.

That is, at the intersection portion 739a, the first notch intersects the second notch. After intersecting the first notch, the second notch 736 may further extend to have an extension 739b.

Figure 5:
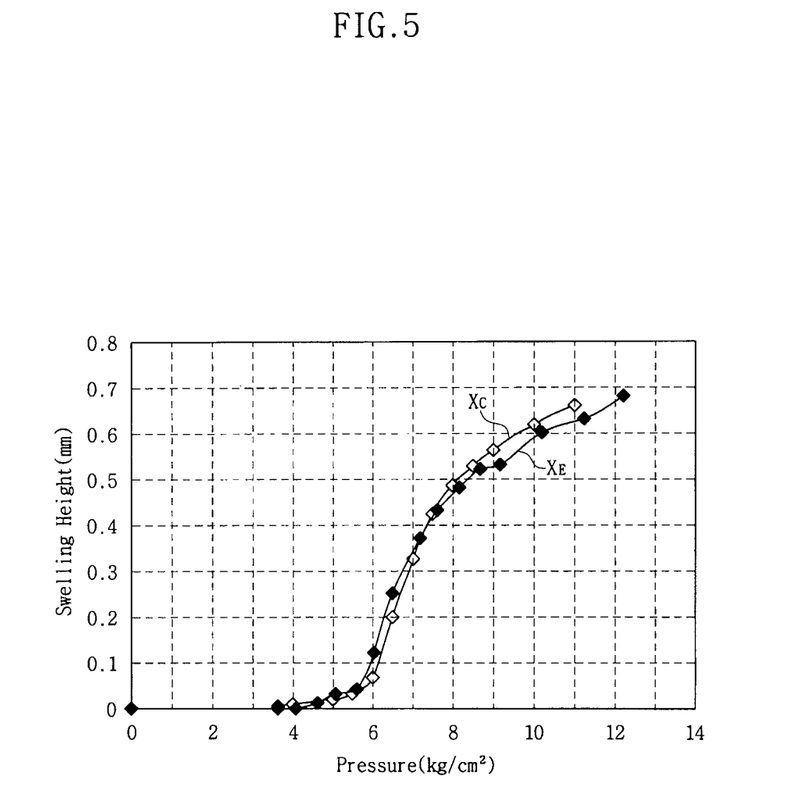
FIGS. 5 and 6 are graphs showing a swelling height according to an operating pressure of a vent according to an exemplary embodiment of the present invention.
Figure 6:
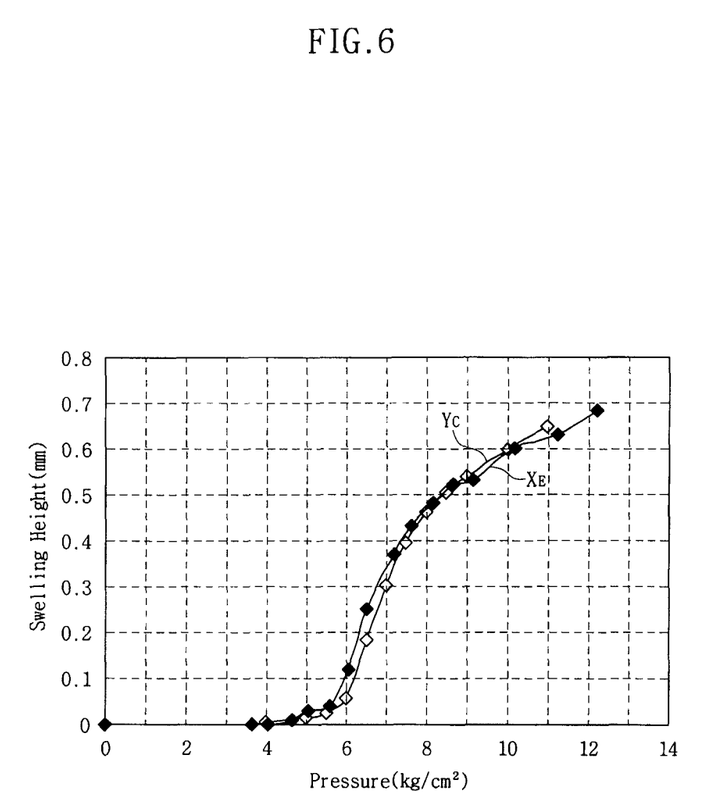

FIGS. 5 and 6 are graphs showing a swelling height according to an operating pressure of a vent according to the present invention.

To begin with, FIG. 5 is a graph of a swelling height according to an operating pressure of a vent according to the third exemplary embodiment as described above.

In this case, a line $X_E$ shows test results obtained using a vent manufactured by molding, and a line $X_C$ shows simulation results.

As described above, in the third exemplary embodiment, a vent has an average operating pressure of 8.15 Kgf/cm², which is lower than an operating pressure (about 9 Kgf/cm² or higher) of a conventional vent.

Referring to the lines $X_E$ and $X_C$, it can be seen that there is no difference between the test results obtained using the vent manufactured by molding and the simulation results.

Meanwhile, FIG. 5 is provided to show that there is no difference between the test results obtained using the vent manufactured by molding and the simulation results, but the results may be differently interpreted by changing a reference value of an operating pressure. For example, when the reference value of the operating pressure is set to 8 Kgf/cm², the vent has to have a swelling height of 0.05 mm or less at an operating pressure of 5 Kgf/cm², and a swelling height has to be 0.45 mm or more at an operating pressure of 8 Kgf/cm².

That is, when the vent has a swelling height of more than 0.05 mm at an operating pressure of 5 Kgf/cm², the operating pressure of the vent is formed at too low an internal pressure, resulting in blocking current flow. When the vent has a swelling height of less than 0.45 mm at an operating pressure of 8 Kgf/cm², it is difficult for the vent to maintain an operating pressure of 8 Kgf/cm².

As described above, these conditions are dependant on the reference value of the operating pressure. In the third exemplary embodiment of the present invention, it can be seen that the lines $X_E$ and $X_C$ both show that the vents have a swelling height of 0.05 mm or less at an operating pressure of 5 Kgf/cm², and a swelling height of 0.45 mm or more at an operating pressure of 8 Kgf/cm².

FIG. 6 is a graph showing the effect of a vent according to FIG. 4 as described above.

In this case, a line $X_E$ shows test results obtained using the vent manufactured by molding according to the third exemplary embodiment, which is the same as the line $X_E$ of FIG. 5. A line $Y_C$ shows simulation results obtained using the vent according to FIG. 4, which was not actually manufactured, but only evaluated in effect through simulation.

Referring to FIG. 6, in the third exemplary embodiment as described above, an average operating pressure of a vent is 8.15 Kgf/cm², which is lower than an operation pressure (about 9 Kgf/cm² or more) of a conventional vent. Also, referring to the lines $X_E$ and $Y_C$, it can be seen that there is no difference between their results.

That is, like other exemplary embodiments of the present invention, it is possible to lower the operating pressure of the vent according to FIG. 4 to less than 9 Kgf/cm², and specifically, to about 8 Kgf/cm². Therefore, current flow may be blocked even when an internal pressure of the secondary battery is low, thereby further improving battery safety.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A cap assembly for a battery that includes a bare cell with an electrode, the cap assembly comprising:
   a plate that is adapted to be electrically connected to the electrode of the bare cell;
   a vent member that includes a protrusion that is physically connected to the plate so as to be electrically connected to the electrode; and
   a positive temperature coefficient (PTC) thermistor electrically connected to the vent member, the PTC thermistor being ring shape,
   wherein the vent member defines a first and a second circular notches and a third cross notch that intersects the first and second circular notches, wherein the first and second circular notches extend around the protrusion and the cross notch extends outward from the first circular notch through the second circular notch so as to intersect the second circular notch and further extend outward from the second circular notch and wherein the depth of the cross notch exceeds the depth of the first and second circular notches and the depth of the cross notch is selected to permit flexing of the vent member at a first pressure and the depth of the second circular cross notch is selected to result in the vent member bursting at a second pressure greater than the first pressure.

2. The cap assembly of claim 1, wherein the first circular notch has a diameter of approximately between 2.5 to 3 mm, the second circular notch has a diameter of approximately 5.0 to 7 mm.

3. The cap assembly of claim 1, wherein the width of the first and second circular notch range from 0.1 mm to 0.2 mm, and the radial type notch ranges from 0.05 mm to 0.15 mm.

4. The cap assembly of claim 1, wherein the depth of the first circular notch ranges from 0.14 mm to 0.20 mm, and the depth of the second circular notch range from 0.18 mm to 0.19 mm.

5. The cap assembly of claim 1, wherein the second circular notch is contoured so as to burst when the pressure in the battery exceeds a burst pressure.

6. The cap assembly of claim 1, wherein the second circular notch is not continuous so as to define a disconnected region so as to inhibit the second circular notch from bursting along its entire circumference.

7. The cap assembly of claim 1, further comprising a cap up and a cap down wherein the vent member is interposed between the cap up and the cap down of the cap assembly.

8. The cap assembly of claim 1, wherein the vent member includes a flange portion that extends about the protrusion and a connecting portion that extends between the flange portion and the protrusion, wherein the protrusion is offset from the flange portion by the connecting portion.

9. The cap assembly of claim 8, wherein the first and second circular notches and the cross notch are formed adjacent the protrusion so as to be interposed between the protrusion and the connecting portion.

10. The cap assembly of claim 1, wherein the cross notch extends inward of the first circular notch.

11. A secondary battery comprising a cap assembly and an electrode assembly, the cap assembly comprising:
   a plate that is adapted to be electrically connected to the electrode of a bare cell;
   a vent member that includes a protrusion that is physically connected to the plate so as to be electrically connected to the electrode assembly; and,
   a positive temperature coefficient (PTC) thermistor electrically connected to the vent member, the PTC thermistor being ring shape, wherein the vent member defines a first and a second circular notches and a third cross notch that intersects the first and second circular notches, wherein the first and second circular notches extend around the protrusion and the cross notch extends outward from the first circular notch through the second circular notch so as to intersect the second circular notch and further extend outward from the second circular notch wherein the depth of the cross notch exceeds the depth of the first and second circular notches and the depth of the cross notch is selected to permit flexing of the vent member at a first pressure and the depth of the second or circular notch is selected to result in the vent member bursting at a second pressure greater than the first pressure.

12. The secondary battery of claim 11, wherein the first circular notch has a diameter of approximately between 2.5 to 3 mm, and the second circular notch has a diameter of approximately 5.0 to 7 mm.

13. The secondary battery of claim 11, wherein the width of the first and second circular notches range from 0.1 mm to 0.2 mm, and the width of the radial notch ranges from 0.05 mm to 0.15 mm.

14. The battery assembly of claim 11, wherein the depth of the first circular notch ranges from 0.14 mm to 0.20 mm, and the depth of the second circular notch range from 0.18 mm to 0.19 mm.

15. The secondary battery of claim 11, wherein the second circular notch is contoured so as to burst when the pressure in the battery exceeds a burst pressure.

16. The secondary battery of claim 11, wherein the second circular notch is not continuous so as to define a disconnected region so as to inhibit the second circular notch from bursting along its entire circumference.

17. The secondary battery of claim 11, further comprising a cap up and a cap down wherein the vent member is interposed between the cap up and the cap down of the cap assembly.

18. The secondary battery of claim 11, wherein the vent member includes a flange portion that extends about the protrusion and a connecting portion that extends between the flange portion and the protrusion, wherein the protrusion is offset from the flange portion by the connecting portion.

19. The secondary battery of claim 18, wherein the first and second circular notches and the cross notch are formed adjacent the protrusion so as to be interposed between the protrusion and the connecting portion.

\* \* \* \* \*